UNITED STATES PATENT OFFICE.

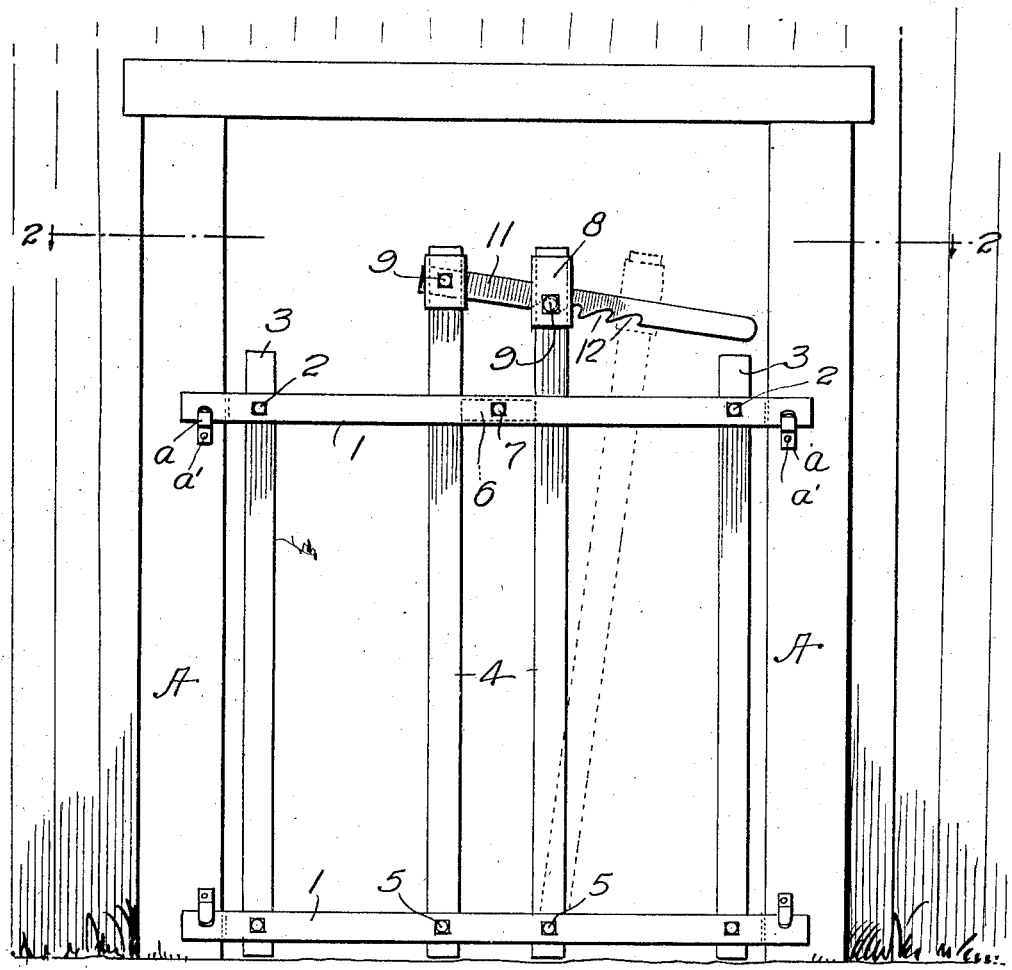
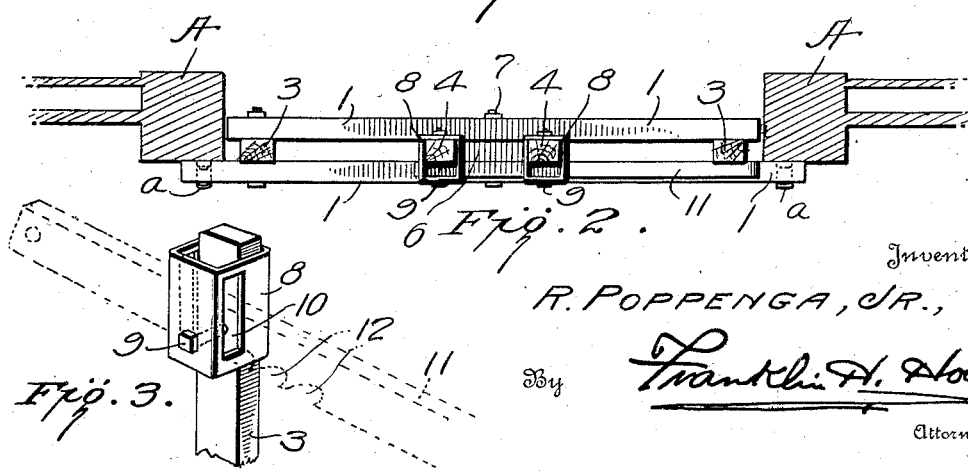

REINER POPPENGA, JR., OF LENNOX, SOUTH DAKOTA.

CATTLE-TRAP.

1,363,054.

Specification of Letters Patent.

Patented Dec. 21, 1920.

Application filed September 23, 1920. Serial No. 412,164.

*To all whom it may concern:*

Be it known that I, REINER POPPENGA, Jr., a citizen of the United States, residing at Lennox, in the county of Lincoln and State of South Dakota, have invented certain new and useful Improvements in Cattle-Traps; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The object of this invention is to provide a novel construction of cattle trap for holding an animal during cutting, vaccinating and dehorning operations, the trap being characterized by extreme simplicity of construction and operation.

A further object is to provide a cattle trap so constructed that it is adapted to be fastened to a barn door frame or to two posts in front of a gate, or a chute.

With these objects in view, the invention resides in the novel construction, combination and arrangement of parts of a cattle trap, as will be hereinafter fully described in the specification, summed up in the claims and illustrated in the accompanying drawing forming a part of my application. In said drawing:

Figure 1 is a view in side elevation of a barn door, or the like, with the trap of my invention in operative position with reference thereto;

Fig. 2 is a sectional view on the line 2—2 of Fig. 1, looking in the direction of the arrows, and Fig. 3 is a fragmentary detail view, in perspective, of one of the clamping members of my trap, and the means for holding the clamping members in adjusted position.

Briefly described:

A, A designate the side members of the frame of a door, such as a barn door, or the like.

The trap of my invention is adapted to be supported from said side members and in this instance cleats *a* are provided which are preferably pivoted to the side members A, as shown at *a'*, and which are adapted to engage horizontal bars 1, 1, constituting two of the frame members of my cage or trap.

Secured to said horizontal members 1, 1, preferably toward the ends thereof, as by means of bolts 2, are two vertical or side frame members 3, 3, the ends of which preferably project beyond the bars 1, 1, as clearly shown in Fig. 1.

Preferably, two pairs of the horizontal frame members 1, 1 are provided, as shown in Fig. 2, the two members of each pair being parallel; and the vertical side bars 3, 3 are disposed between said parallel side members 1, 1, as shown in Fig. 2, the bolts 2 passing through said parallel members 1, 1 and through the posts 3. The members of each pair of bars 1 are thus held in spaced relation by said bars 3, 3. Preferably, of course, one of the bars 1 of each pair is shorter than the other, as clearly shown in Fig. 2, so as to fit between the side members A, A of the door frame, and the longer bar 1 of each pair is adapted to bear against the outer face of said frame members A, A.

Clamping members, in this instance bars 4, 4, are preferably supported at their lower ends between the members of the lower pair of bars 1, as by means of pivot bolts 5, said clamping bars 4, 4 extending upward between the members of the upper pair of parallel bars 1, 1, as shown in Fig. 1. Movement of said clamping bars 4, 4 toward each other is limited by a spacing member or stop 6, which is secured between the members of the upper pair of bars, as by means of a bolt 7.

Toward the top, the clamping bars 4, 4 carry boxes 8, 8, which are preferably rectangular structures, as shown clearly in detail in Fig. 3, and which are secured to said clamping bars 4, 4 in any suitable manner, as by means of bolts 9. As shown in Fig. 3, each of said boxes closely hugs the adjacent clamping bar 4 on three sides thereof and is spaced from said bar on the fourth side; and the side walls of each of said boxes are provided with longitudinally extending parallel slots 10, 10 adjacent the wall of said box which is spaced from said clamping bar 4, and provided in the side wall of each boxing 8 adjacent the wall which is spaced from and parallel with one of the faces of the bar 4. A clamping bar holding and adjusting member 11 is pivoted at one end to one of the bolts 9 of one of the boxes 8, and projects through the parallel slots 10, 10 of each box 8 and is provided on its under side with a longitudinally extending series of cut-away portions or notches 12, any one of which may be engaged with a bolt 9 of the other box 8, as shown in Fig. 1, thereby holding the clamping bars 4, 4 in adjusted position.

In operation, the head of the animal to be operated upon projects between the clamping bars 4, 4, which bear against the neck of the animal, and the bars 4, 4 are moved toward each other, so as to clamp the neck of the animal therebetween, the bars being secured in such adjusted position by means of the pin and notch construction described.

What I claim to be new is:

1. A cattle trap comprising two parallel pairs of horizontal frame bars, two vertical side bars disposed between the members of each pair of horizontal bars, means for securing said vertical and horizontal bars together, two clamping bars positioned between the members of each pair of horizontal bars, and pivotally secured at their lower ends between the members of the lower pair of horizontal bars, rectangular boxes carried at the upper end of said clamping bars, each of said boxes bearing against three faces of the corresponding clamping bar, the fourth side wall of said box being spaced from and parallel with the fourth face of said clamping bar, each of said boxes being provided in its two side walls with longitudinally extending parallel slots adjacent the wall of the box which is spaced from the clamping bar, and a clamping bar adjusting and holding member projecting through said parallel slots and pivotally secured to one of said boxes, and coöperating means carried by the other box and said clamping member for holding the bars in adjusted position on their pivots.

2. A cattle trap comprising horizontal top and bottom frame members, two clamping bars pivotally secured at their lower ends to the bottom horizontal bars, boxes carried at the top of said clamping bars, each box being provided with two parallel slots, and a clamping bar adjusting and holding member projecting through said slots and pivoted to one of said boxes, and coöperating means carried by the other of said boxes and said clamping member for holding said clamping bars in adjusted position.

3. In a cattle trap the combination of top and bottom horizontal frame bars, of two clamping bars pivotally secured at their lower ends to said bottom horizontal bars, and carrying at their top boxes provided each with two parallel longitudinally extending slots, a clamping bar adjusting and holding member pivotally secured to two of said boxes and projecting through said slots, and having a series of longitudinally extending notches, and a bolt passing through the other of said boxes and through the adjacent clamping bar for holding said box thereto, any one of said notches being engageable with said bolt to hold the clamping members in adjusted position.

In testimony whereof I hereunto affix my signature.

REINER POPPENGA, Jr.